United States Patent
Bychowsky et al.

(10) Patent No.: US 6,954,432 B1
(45) Date of Patent: Oct. 11, 2005

(54) METHOD AND APPARATUS FOR IMPROVING PERCEIVED SIGNAL QUALITY OF TRANSMITTED INFORMATION IN A FULL DUPLEX WIRELESS COMMUNICATION SYSTEM

(75) Inventors: Michael W. Bychowsky, Harvard, IL (US); Michael Kloos, Elgin, IL (US); Derek Oxley, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 1018 days.

(21) Appl. No.: 09/678,716

(22) Filed: Oct. 4, 2000

(51) Int. Cl.[7] .............................. H04J 1/16; H04J 3/14; H04J 3/06; H04L 1/00; H04L 12/26
(52) U.S. Cl. ..................................... 370/236; 370/509
(58) Field of Search ........................ 370/236, 238, 370/284, 324, 350, 503, 508, 516, 517, 519

(56) References Cited

U.S. PATENT DOCUMENTS 6,215,791 B1 * 4/2001 Kim ........................... 370/412
6,449,255 B1 * 9/2002 Waclawsky ................. 370/236

\* cited by examiner

Primary Examiner—Huy D. Vu
Assistant Examiner—Daniel Ryman
(74) Attorney, Agent, or Firm—Jeffrey K. Jacobs (57) ABSTRACT

A full duplex wireless communication system (100) one or more wireless communication devices (101) and fixed infrastructure equipment that includes at least a transcoder (201), a router (203) and a base transceiver site (BTS, 103). To reduce delays of information packets communicated between the transcoder and the BTS, the transcoder, router and BTS employ a unique synchronization-based priority scheme. In accordance with the priority scheme, an indication of the status of synchronization between the transcoder and the BTS is included in an information pace to guide the router's processing of the packet. In the event that the router stores the packet the router preferably inserts a time-delay indication into a portion of the packet. The BTS uses the time-delay indication to determine a desired transcoder transmission time, and communicates an indication of the desired transcoder transmission time to the transcoder.

31 Claims, 4 Drawing Sheets

METHOD AND APPARATUS FOR IMPROVING PERCEIVED SIGNAL QUALITY OF TRANSMITTED INFORMATION IN A FULL DUPLEX WIRELESS COMMUNICATION SYSTEM

FIELD OF THE INVENTION

The present invention relates generally to wireless communication systems that provide full duplex communications and, in particular to, a method and apparatus for improving perceived signal quality of transmitted information in a full duplex wireless communication system.

BACKGROUND OF THE INVENTION

Full duplex wireless communication systems are well known and include various types of systems, such as cellular telephone systems, personal communication systems, integrated systems, such as the "MOTOROLA" "iDEN" system, and real-time video systems. Such wireless systems are known to include a system infrastructure and communication devices constructed and programmed to operate in the respective system. The system infrastructure includes fixed network equipment, such as base transceiver sites (BTSs), system controllers (e.g., base site controllers (BSCs)), switching centers, routers, communication links, antenna towers, and various other known infrastructure components.

Certain wireless communication systems, such as digital cellular systems and the "MOTOROLA" "iDEN" system utilize voice compression techniques, such as vector sum-excited linear predictive (VSELP) encoding, advanced multi-band excitation (AMBE) encoding or code-excited linear predictive (CELP) encoding, to more efficiently utilize available frequency spectrum. In such systems, each BSC and each wireless communication device include one or more transcoders that encode (compress) pulse code modulated (PCM) or other digitally sampled voice signals received from the audio portion of the infrastructure (e.g., from a mobile switching center (MSC)) or communication device, respectively, and decode (decompress) received compressed voice signals received from the radio frequency portion of the infrastructure (e.g., BTS) or communication device, respectively. Each transcoder includes one or more digital signal processors (DSPs) and associated control circuitry and operating software. With current DSP technology, each DSP can support one or more two-way, full duplex audio communications.

To compress incoming PCM audio signals, the infrastructure transcoder typically encodes a predetermined amount of audio and packetizes the encoded audio to comply with the transmission format of the outgoing communication link. The amount of audio encoded by the transcoder corresponds to the radio transmission access protocol employed by the BTS. For example, the BSC transcoder of the "iDEN" system VSELP encodes ninety (90) milliseconds (ms) of audio in two forty-five (45) millisecond transmission frames or three thirty (30) millisecond transmission frames (depending on whether the BTS transmission rate is full rate or half rate) and packetizes the transmission frames into a single information packet in accordance with a high data level link control (HDLC) protocol utilized on the communication link between the BSC and its associated BTSs. The "iDEN" BTS employs a time division multiple access (TDMA) transmission protocol in which each time slot supports ninety (90) milliseconds of information (compressed audio or data). Therefore, the ninety milliseconds of compressed audio in each HDLC information packet coincides with the amount of compressed audio that may be transmitted from the BTS in a single time slot.

The timing at which the BSC communicates compressed transmission frames to a BTS also depends on the particular radio transmission access protocol employed by the BTS. Such timing is particularly important when the access protocol is time-based, such as the TDMA protocol utilized in the "iDEN" system and other digital cellular systems (e.g., the Global System for Mobile Communications (GSM)). For proper transmission from a BTS that utilizes a TDMA protocol, the BTS and BSC must be synchronized such that the BSC conveys an information packet, which may include multiple transmission frames, to the BTS prior to the beginning of the transmission time slot allocated for transmitting the packet. Optimally, the packet should arrive at the BTS just early enough to enable the BTS to process the packet (e.g., modulate, filter, upconvert, and amplify) before the beginning of the transmission time slot to minimize the amount of buffering or storage of compressed audio that must occur at the BTS and, therefore, minimize the gaps or choppiness in audio perceived by the user of the recipient communication device.

However, due to various delay mechanisms within the infrastructure, and even within the transcoders themselves, a fixed synchronization between BSC and BTS is not possible. Therefore, BSCs and BTSs typically employ a synchronization protocol in an attempt to maintain synchronization in view of the various delays. Under such protocols, the BTS instructs the BSC to adjust its packet transmission time based on the historical arrival of information packets from the BSC for a particular communication.

BSCs typically service multiple BTSs in full duplex wireless systems. Consequently, each BSC commonly includes a router that directs encoded audio from the transcoder to the appropriate BTS. When a deterministic transport protocol, such as a circuit-switched protocol, is used between the router and the BTS, the router introduces a determinate, but not necessarily fixed, delay which can be taken into account by the BTS when instructing the BSC to transmit a particular information packet in accordance with the synchronization protocol. However, packet switching is becoming more popular these days to increase the effective bandwidth of the communication path between the BSC and the BTS.

When a packet-switched transport protocol is used to communicate information from the BSC to the BTS, the delays introduced by the router become non-deterministic and may produce wide variances in arrival times of information packets at the BTS. In an attempt to account for such wide variances, prior art BTSs estimate the router delay and request transmission of packets from the transcoder based on the estimate in accordance with their respective synchronization protocols. However, notwithstanding such estimation by the BTS, the nondeterministic nature of the BSC-to-BTS transport can result in receipt of a packet by the BTS after the BTS transmission time for the packet has expired. That is, the indeterminate delays of the router in a nondetermistic system can result in missed packet transmissions and poor signal quality (e.g., choppy audio) as perceived by a user of a wireless communication device.

In addition to introducing variable delays, a non-deterministic packetized transport employed between the BSC and the BTS provides no order with which the router transmits packets received from the transcoder. Such a lack of order can introduce undesirable delays, and therefore poor perceived signal quality, in communications in which synchronization between the BSC and BTS is already established. For example, if the router receives a packet for a first full-duplex communication that is just commencing and in which synchronization is not yet established between the BSC and the BTS, and another packet for a second full-duplex communication that is ongoing and in which synchronization has been established between the BSC and the BTS, the router may communicate the first communication's packet to the BTS before communicating the second communication's packet, thereby introducing an undesired delay in the conveyance of the second communication's packet and degrading perceived quality of the second communication.

Therefore, a need exists for a method and apparatus for improving signal quality of transmitted information as perceived by a user of a wireless communication device that accounts for variable delays introduced by a BSC's router when a non-deterministic packetized transport is used to communicate information between the router and the BTS, and that appropriately prioritizes transmissions from the BSC to its respective BTSs to minimize delays and thereby substantially improve the quality of communications as perceived by users of recipient wireless communication devices.

DETAILED DESCRIPTION OF A PREFERRED EMBODIMENT

Generally, the present invention encompasses a method and apparatus for improving perceived signal quality of transmitted information within a full duplex wireless communication system. The wireless communication system includes fixed infrastructure equipment and one or more wireless communication devices. The fixed infrastructure equipment includes a transcoder, a router and a base transceiver site (BTS). The router is operably coupled between the transcoder and the BTS, and supports a non-deterministic packetized transport for communicating information between the transcoder and the BTS as information packets.

To reduce communication delays between the transcoder and the BTS, the transcoder, router and BTS employ a unique priority scheme for communicating information packets generated by the transcoder to the BTS. The transcoder determines a priority of an information packet based on the status of synchronization between the transcoder and the BTS with respect to the packet. The transcoder includes an indication of the determined priority in the information packet and communicates the packet to the router at a time previously indicated by the BTS. Upon receiving the packet, the router examines the priority and either stores the packet (e.g., when the priority indication indicates that the transcoder and the BTS are not yet in synchronization) or communicates the packet to the BTS (e.g., when the priority indication indicates that the transcoder and the BTS are in synchronization).

In the event that the router stores the packet, the router inserts a time-delay indication (e.g., a timestamp) into a portion of the packet prior to communicating the packet to the BTS to inform the BTS of how long the packet was stored in the router. The BTS uses the time-delay indication, the arrival time of the packet at the BTS, and its own upcoming transmission time to determine a desired transcoder transmission time for a subsequent packet of the same communication. The BTS then communicates an indication of the desired transcoder transmission time to the transcoder via the router or otherwise.

By communicating information packets between the transcoder and the BTS in this manner, the present invention effectively reduces the router delays incurred by information packets in synchronized communications between the transcoder and the BTS, thereby improving perceived signal quality of such communications. In addition, the present invention provides a protocol to account for router delays in the transcoder-to-BTS synchronization process, thereby reducing the likelihood that information packets communicated by the transcoder will miss their corresponding BTS transmission times resulting in improved perceived signal quality of communications that include such information packets.

Figure 1:
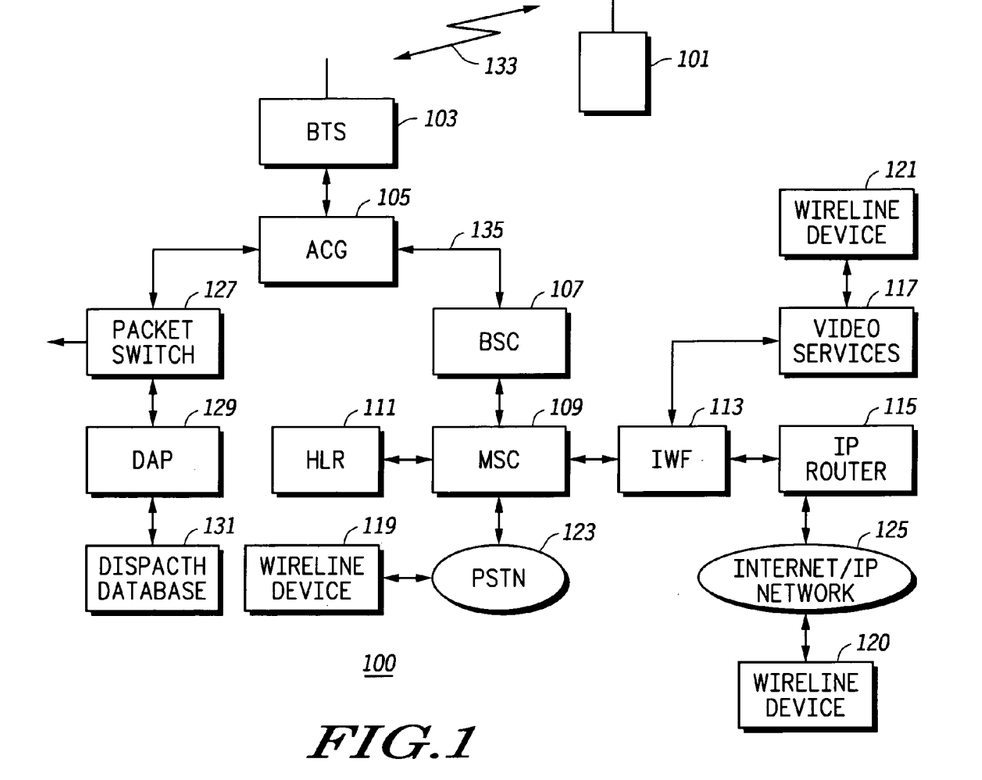
FIG. 1 illustrates a block diagram of an exemplary wireless communication system that supports full duplex communications in accordance with the present invention.

The present invention can be more fully understood with reference to FIGS. 1–6, in which like reference numerals designate like items. FIG. 1 illustrates a block diagram of an exemplary full duplex, wireless communication system 100 in accordance with the present invention. The communication system 100 preferably comprises an integrated cellular telephone, two-way dispatch, paging and data system, such as the "iDEN" system that is commercially available from Motorola, Inc. of Schaumburg, Ill., which is appropriately configured and programmed to implement the present invention. Alternatively, the communication system 100 might comprise a two-way radio system, a cellular telephone system, a cordless telephone system (e.g., a wireless local loop), a home wireless network, a personal communication system (PCS), a personal area network (e.g., a Bluetooth network), a wireless voice and data system, a wireless video system, or any combination thereof.

As shown in FIG. 1, the communication system 100 includes one or more wireless communication devices 101 (one shown), one or more wireline communication devices 119–121 (three shown), and a system infrastructure. The wireless communication devices 101 may comprise two-way mobile or portable radios, radiotelephones, wireless audiovisual terminals, or any combination thereof. The wireline communication devices 119–121 may comprise computers, data terminals, and/or personal digital assistants which are capable of transmitting audio and/or video information, telephones, Internet servers, or video-conferencing equipment.

The system infrastructure includes, inter alia, one or more base transceiver sites (BTSs) 103 (one shown), one or more wireless system controllers, and various other infrastructure components configured in accordance with known techniques to implement the selected functionality of the particular communication system 100. For example, in the integrated system 100 of FIG. 1, the infrastructure components that support two-way dispatch service comprise, inter alia, an access control gateway (ACG, 105), a metropolitan packet switch 127, a dispatch application processor 129, and a dispatch database 131. The infrastructure components that support full duplex, two-way voice communications comprise, inter alia, the ACG 105, a base site controller (BSC, 107), a mobile switching center (MSC, 109), a home location register (HLR, 111), and the public-switched telephone network (PSTN, 123). The additional infrastructure components that support two-way data and/or synthesized voice transmissions comprise an interworking function (IWF, 113), an Internet Protocol (IP) router 115, and the Internet or another IP network 125. Finally, the additional infrastructure components that support two-way video or audiovisual transmissions comprise the IWF 113 and video service-specific equipment 117, such as a video server.

Depending on the type of system 100, each BTS 103 may comprise transmitters, receivers, control and storage equipment, and telephone interconnect equipment. The wireless system controllers preferably comprise the ACG 105, the DAP 129, the BSC 107, and the MSC 109. Alternatively, a wireless system controller may comprise any other known controller, such as a paging system controller or a central controller, that is appropriate for controlling communications in the particular system 100. Except for appropriate software and hardware modifications necessary to implement the present invention as described below, the infrastructure components of the system 100 are well-known to one of ordinary skill in the art; thus, no further discussion of them will be presented except to facilitate an understanding of the present invention.

The infrastructure components of the system 100 are interconnected via various communication links. Such links may comprise any known communication links, including without limitation, leased telephone lines, such as T1 or T3 lines, microwave link, integrated services digital network (ISDN) lines, digital subscriber lines (DSLs), low speed (e.g., 56 kilobit per second) data links, RS-232 links, or a common hardware bus (e.g., when the BTS 103 is directly coupled to the ACG 105, the BSC 107 or other system controller, such as when the BTS 103 and the ACG 105 are collocated). In the event that any infrastructure component shown in FIG. 1 as being directly coupled to another component is not so directly coupled, the communication links between such infrastructure components may include other elements, such as switches or switching centers, routers gateways, bridges, controllers, or any other components used to interconnect systems or portions thereof.

The BTS 103 provides communication service to a respective geographic service coverage area, conveying information to and receiving information from wireless communication devices 101 located in the service coverage area over wireless communication resources 133. Depending on the access scheme utilized in the system 100, each communication resource 133 may comprise a frequency carrier, one or more time slots of a frequency carrier, or an orthogonal code implemented by a respective frequency hopping pattern or by a pseudo-random noise sequence spread over a wide (e.g., 3 MHz) bandwidth. In the preferred embodiment, the access scheme of the system 100 is a time division multiple access (TDMA) scheme; accordingly, the communication resources 133 comprise one or more time slots of a frequency carrier.

Figure 2:
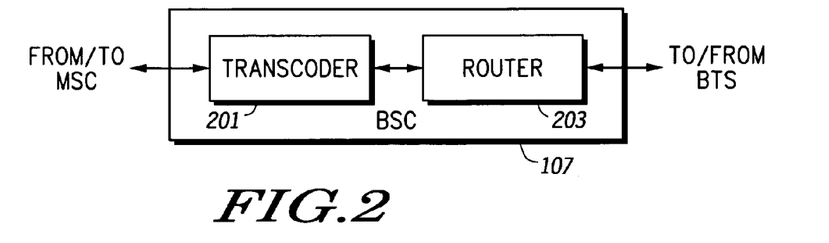
FIG. 2 illustrates a block diagram of the base site controller of FIG. 1 in accordance with the present invention.

FIG. 2 illustrates a block diagram of the BSC 107 of FIG. 1 in accordance with the present invention. The BSC 107 includes, inter alia, a so-called "transcoder" 201 and a router 203. The transcoder 201 compresses pulse-code modulated (PCM) audio signals received from the MSC 109 into encoded signals for ultimate transmission over the wireless resource 133. The transcoder 201 is so-called because it effectively transforms the wireline coded signals (i.e., PCM) into wireless coded signals. Transcoding of PCM signals is typically referred to as "vocoding" (i.e., voice encoding). In the preferred embodiment, the transcoder 201 employs a vector sum-excited linear predictive (VSELP) code to compress or vocode the PCM audio signals. Other vocoding techniques, such as advanced multi-band excitation (AMBE) encoding or code-excited linear predictive (CELP) encoding, are also known and may be alternatively employed by the transcoder 201. The transcoder 201 is preferably implemented in a digital signal processor (DSP) integrated circuit (IC).

The router 203 preferably comprises a computer or a group of integrated circuits configured on a computer card that serve to route encoded information packets received from the transcoder 201 to appropriate BTSs 103 for subsequent transmission to wireless communication devices 101. The BTS 103 and the BSC 107 utilize a non-deterministic packetized transport, such as packet switching, for communicating information over the communication link 135 between them. Accordingly, the router 203 is configured to support such a non-deterministic packetized transport.

Except for appropriate hardware (e.g., a timing circuit with sufficient timing accuracy) and software modifications necessary to implement the present invention as described below, the transcoder 201 and router 203 are well-known to one of ordinary skill in the art; thus, no further discussion of them will be presented except to facilitate an understanding of the present invention.

Figure 3:
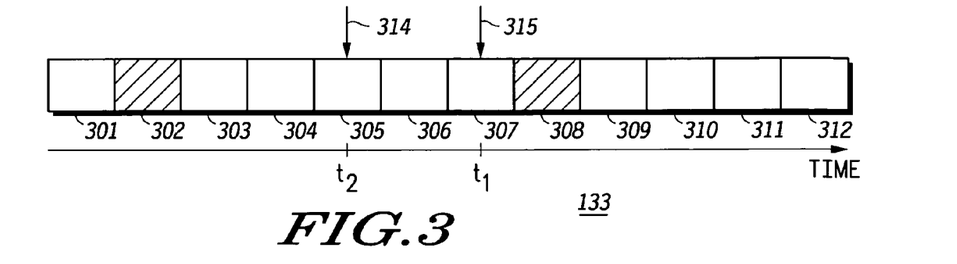
FIG. 3 illustrates arrival times of information packets at the base transceiver site of FIG. 1 with respect to transmission times of such packets in accordance with the prior art and a preferred embodiment of the present invention.

FIG. 3 illustrates arrival times 314, 315 of information packets at the BTS 103 of FIG. 1 with respect to BTS transmission times of such packets in accordance with the prior art and a preferred embodiment of the present invention. As discussed above, the preferred full duplex wireless communication system 100 utilizes a TDMA protocol for communicating information over the wireless resources 133. Accordingly, each frequency carrier is divided into a plurality of time slots 301–312. The time slots 301–312 are typically grouped into time frames. For example, in the "MOTOROLA" "iDEN" system, each time frame includes six time slots (e.g., slots 301–306). By contrast, in GSM, each time frame includes three time slots (e.g., slots 301–303).

Each communication is typically allocated to one or more time slots per repeating time frame. In the "iDEN" system, half-duplex dispatch communications are typically assigned one time slot 302 per time frame; whereas, full duplex telephone communications are assigned either one time slot 302 per frame or two time slots (e.g., 302 and 305) per frame. To include encoded information from the BSC 107 in a particular time slot 308, the BTS 103 must receive the information from the BSC 109 a minimum amount of time prior to the beginning of the time slot 308.

As described in the Background section above, unaccounted for variable delays associated with the router 203 can result in receipt of information from the BSC 109 after the time deadline has passed for including such information in the time slot 308 allocated to the communication in which the information was slated for transmission. In accordance with the prior art, such potential router delays are typically over-compensated for to take into account maximum variances associated with packet arrivals at the BTS 103, resulting in information arrival times well in advance of the beginning of the intended time slot. For example, in accordance with the prior art, information to be transmitted in time slot 308 might arrive at the BTS 103 more than two slots earlier than the commencement of the intended time slot 308 (i.e., at time $t_2$ corresponding to arrow 314). Such early arrival of the information creates an information backlog and introduces delays into the communication.

By contrast, utilizing the below-described synchronization-based priority scheme of the present invention, the router 203 preferably delivers the information to the BTS 103 just prior to the intended transmission time of the time slot 308 (e.g., within the time span of a time slot 307 immediately preceding the time slot 308 allocated for the information). Arrival of the information from the BSC 109 just prior to BTS transmission substantially reduces the delay and improves perceived signal quality. Thus, in accordance with the present invention, the information to be transmitted preferably arrives at the BTS 103 at time $t_1$ corresponding to arrow 315.

Referring now to FIGS. 1–3, operation of the full duplex, wireless communication system 100 occurs substantially as follows in accordance with the present invention. The transcoder 201 receives PCM samples from the MSC 109 and encodes the samples in accordance with known techniques to generate an information packet compatible with the time-based wireless transmission (e.g., TDMA) protocol employed in the system 100. In the event that the information packet is part of an ongoing communication, the transcoder 201 determines a desired transmission time for the packet based on an indication of such transmission time previously received from the BTS 103. The indication preferably comprises a timing offset to be applied to an upcoming transcoder transmission time, wherein the timing offset is with respect to one or more prior transcoder transmission times associated with previously transmitted information packets of the communication. For example, if the transcoder 201 transmitted prior packets of the communication, on average, thirty milliseconds (30 ms) before the beginning of the wireless time slot 308 in which the packet was to be transmitted, and the BTS 103 determines that such packets arrived ten milliseconds too early, then the BTS 103 preferably instructs the transcoder 201 to transmit the next packet of the communication ten milliseconds later than the transcoder 201 would have without such instruction.

Since the BSC 109 is typically programmed with the time slot parameters (e.g., time period in each slot and number of slots per frame), the BSC 109 or transcoder 201 can compute the exact desired transcoder transmission time based on the timing offset or delta received from the BTS 103. Alternatively, the indication from the BTS 103 might comprise a time difference between the BTS transmission time (e.g., commencement of a time slot 308) and the desired transcoder transmission time, a timing offset between the desired transcoder transmission time and a single prior transcoder transmission time or the desired transcoder transmission time itself in the event that the BTS 103 is informed by the router 203 as to the delay to be incurred by each packet of a particular communication.

In the event that the information packet is a packet at the beginning of the communication and the transcoder 201 has not received a desired transcoder transmission time indication, the transcoder 201 communicates the packet at a random initial transmission time. All subsequent transmission times and timing adjustments referred to herein are made by the transcoder relative to this initial transmission time.

In addition to determining the appropriate transmission time for the packet, the transcoder 201 also determines the priority of the packet. The priority is based on the synchronization status of the transcoder 201 and BTS 103 with respect to the packet. The packet is assigned the highest priority when the transcoder 201 and the BTS 103 are in synchronization. The priority of a particular packet is preferably indicated by two or three bits (depending on the desired number of priority levels) inserted into the header or other portion of the packet.

The transcoder 201 and the BTS 103 are in synchronization when no adjustment is necessary to the transcoder's transmission time relative to the BTS's transmission time. The BTS 103 may inform the transcoder 201 that no adjustment to a previous transcoder transmission time is necessary (e.g., by communicating a timing offset value of zero to the transcoder 201) or the BTS 103 may simply not respond within a predetermined time after a transcoder transmission, thereby impliedly indicating no timing adjustment is necessary. For example, if the most recent transmission or a group of recent transmissions of information from the transcoder 201 for a particular communication arrive at the BTS 103 within respective desired windows of time prior to the times that the BTS 103 must transmit the information in accordance with the TDMA protocol employed in the system 100, the BTS 103 determines that the transcoder 201 and the BTS 103 are synchronized with respect to the communication and informs the transcoder 201 of such synchronization either expressly or impliedly. In such a case, the transcoder 201 communicates the next packet of the communication to the router 203 at the same timing offset relative to the BTS transmission time as the transcoder 201 used for the prior packet(s).

When the transcoder 201 and the BTS 103 are in the process of synchronizing, the transcoder 201 preferably assigns the information packet the next highest priority. In accordance with the invention, the transcoder 201 and the BTS 103 are in the process of synchronizing when the transcoder 201 has recently received at least one transcoder transmission time indication from the BTS 103 that does not comprise a zero-valued timing offset. Additional lower level priorities may also be assigned to initial packets of a communication (i.e., those packets which are communicated by the transcoder 201 prior to the transcoder 201 receiving a transcoder transmission time indication from the BTS 103), and/or packets containing control information.

At the appropriate transcoder transmission time, the transcoder 201 communicates the particular information packet to the router 203. The router 203 evaluates the header or other portion of the packet that includes the indication of priority to determine the packet's priority. Based on the packet's priority, the router 203 either communicates the packet to the BTS 103 or stores the packet for later transmission to facilitate the communication of higher priority packets. For example, when the priority indicates that the transcoder 201 and the BTS 103 are in synchronization with respect to the received packet, the router 203 proceeds with communicating the packet to the BTS 103. On the other hand, when the priority indicates that the transcoder 201 and the BTS 103 are in the process of synchronizing with respect to the received packet, the router 203 stores the packet for a period of time in accordance with any other protocols operating between the router 203 and the BTS 103 to enable one or more higher priority packets to be routed to their respective BTSs 103.

Occasionally, the router 203 may receive multiple packets of the same priority (e.g., of the priority indicating synchronization between the transcoder 201 and the BTS 103). In such a case, the router 203 uses a first in, first out (FIFO) procedure to communicate the equal priority packets. That is, in the event that the router 203 has received multiple packets of the same priority, the router 203 evaluates the times of arrival of the packets at the router 203 to determine the order of communication of the packets to their respective BTSs 103. The equal priority packets are then communicated to their respective BTSs 103 in the order in which they were received by the router 203.

In the event that the router 203 stores the packet at all or alternatively stores the packet for more than a de minimis period of time (e.g., more than five milliseconds), the router 203 inserts a time-delay indication into the header or another predetermined portion of the packet. The time-delay indication corresponds to and identifies the period of time that the packet was stored in the router 203. In a preferred embodiment, the time-delay indication comprises a group of bits that identify the average period of time that the information packet and any previous information packets of the same communication were stored in the router 203. Thus, in the preferred embodiment, the BTS 103 assumes that the indicated time-delay for a particular packet corresponds to such an average period of time.

Alternatively, the time-delay indication may comprise a group of bits that identify other information from which the packet storage period may be computed. For example, the time-delay indication may comprise the quantity of packets (e.g., higher priority packets) that were communicated by the router 203 to the BTS(s) 103 during the time period in which the packet was stored in the router 203. For a predetermined packet or transmission frame size (in bytes) and a pre-established transmission speed of the link 135 between the router 203 and the BTS 103 (in bytes per second), the BTS 103 may calculate the packet storage period. For instance, assuming the packets previously conveyed by the router 203 were all of the same length or time duration as the packet to be communicated, the packet storage period equals the number of packets communicated while the packet-at-issue was stored times the length of each packet, divided by the transmission speed of the link 135 between the router 203 and the BTS 103, or $$T_s = (N \times P)/L,$$

where $T_s$ is the storage period in seconds, N is the number of packets communicated while the packet-at-issue was stored in the router 203, P is the length of each packet in bits, and L is the transmission speed of the link 135 between the router 203 and the BTS 103 in bits per second.

As another example, the time-delay indication may comprise the period of time that a single, particular information packet was stored in the router 203 as opposed to an average storage period for multiple packets. Still futher, the time-delay indication may comprise an average quantity of packets that were communicated by the router 203 to the BTS(s) 103 during the time period in which the packet and any previous packets of the communication were stored in the router 203. In this case, the BTS 103 computes the packet storage time using the equation set forth above.

After inserting the time-delay indication in the packet, the router 203 communicates the packet to the BTS 103 for wireless transmission to the appropriate wireless communication device 101.

Upon receiving the packet from the router 203, the BTS 103 first determines if the time slot 308 for the packet's transmission has passed. If the slot 308 has passed, the BTS 103 drops or deletes the packet as in the prior art. If the transmission slot 308 has not passed, the BTS 103 extracts the time-delay indication, if any, stores the packet if received too far in advance of the transmission slot start time, processes the packet in accordance with known techniques (e.g., modulates, filters, upconverts, and amplifies) to comport with the TDMA protocol, and transmits the information in the packet to the wireless device 101 during the packet's assigned time slot 308.

Through use of the present invention, many less packets are dropped or stored for long periods of time in comparison to prior art approaches. Rather, through use of the method described herein, when the BTS 103 and the transcoder 201 are synchronized with respect to information packets in a particular communication, the packets are received by the BTS 103 during the time span of the time slot 307 immediately preceding the desired transmission time slot 308. Therefore, once the BTS 103 and the transcoder 201 are synchronized pursuant to the present invention, fewer packets of the communication are dropped or undesirably delayed as compared to the prior art, thereby improving the quality of the communication as perceived by a user of the wireless device 101.

In addition to processing and transmitting the packet, the BTS 103 determines, based on the time of arrival of the packet with respect to the BTS's transmission time at the commencement of the time slot 308, whether the BTS 103 and the transcoder 201 are in synchronization. When the BTS 103 and the transcoder 201 are in synchronization, the BTS 103 indicates such condition to the transcoder 201, as discussed above, either by sending a desired transcoder transmission time indication to the transcoder 201 via the router 203 expressly indicating such synchronization or by not responding to the transcoder 201 within the time period since transmission of the previous packet, thereby impliedly indicating such synchronization.

When the BTS 103 and the transcoder 201 are not in synchronization, as evidenced by a dropped packet or by an undesired storage period in the BTS 103 prior to transmission of the packet in the time slot 308, the BTS 103 utilizes the time-delay indication in the packet to determine a desired transcoder transmission time for a subsequent packet of the communication. For example, if the time-delay indication indicates that the average router storage time is thirty milliseconds and the packet was received at time 314, five milliseconds before the time slot 307 immediately preceding the transmission time slot 308 (or twenty milliseconds prior to the BTS transmission time when each time slot is fifteen milliseconds), the BTS 103 might determine the desired transcoder transmission time (e.g., timing offset) for the next packet as fifteen milliseconds in an attempt to have the next packet arrive at time 315, ten milliseconds prior to the start of the transmission time slot 308 for that packet. Accordingly, the BTS 103 prepares and communicates a desired transcoder transmission time indication to the router 203 for subsequent communication to the transcoder 201. The desired transcoder transmission time indication, as discussed above, preferably comprises a timing offset from a transcoder transmission time of a prior information packet, but might alternatively comprise the desired transcoder transmission time itself in the event that the BTS 103 is informed by the router 203 as to the delay to be incurred by each subsequent packet of the communication.

As described above, the present invention provides a wireless communication system and method of operation to reduce delays normally encountered within the system infrastructure by audio or other information packets of a full duplex communication, thereby improving the perceived quality of such a communication. In accordance with the present invention, the transcoder 201, the router 203, and the BTS 103 engage in a protocol in which router storage delays are tracked and used to adjust the transcoder's transmission time in an attempt to deliver packets to the BTS 103 within a desired window of time prior to the BTS's transmission time (e.g., commencement of an assigned time slot 308). By providing packets to the BTS 103 within such a desired window of time, the present invention reduces packet storage delays at the BTS 103, thereby improving perceived audio quality. In addition to delivering packets to the BTS 103 within a desired time window, the present invention also utilizes a synchronization-based priority transmission scheme to reduce delays between the transcoder 201 and the BTS 103 normally encountered in prior art systems due to the variable delays of prior art BSC routers which support a non-deterministic packetized transport between the router 203 and the BTS 103. Such reduced router delays increase the likelihood that the information packets will arrive timely at the BTS 103 for transmission to the wireless device 101, thereby improving perceived communication quality.

Figure 4:
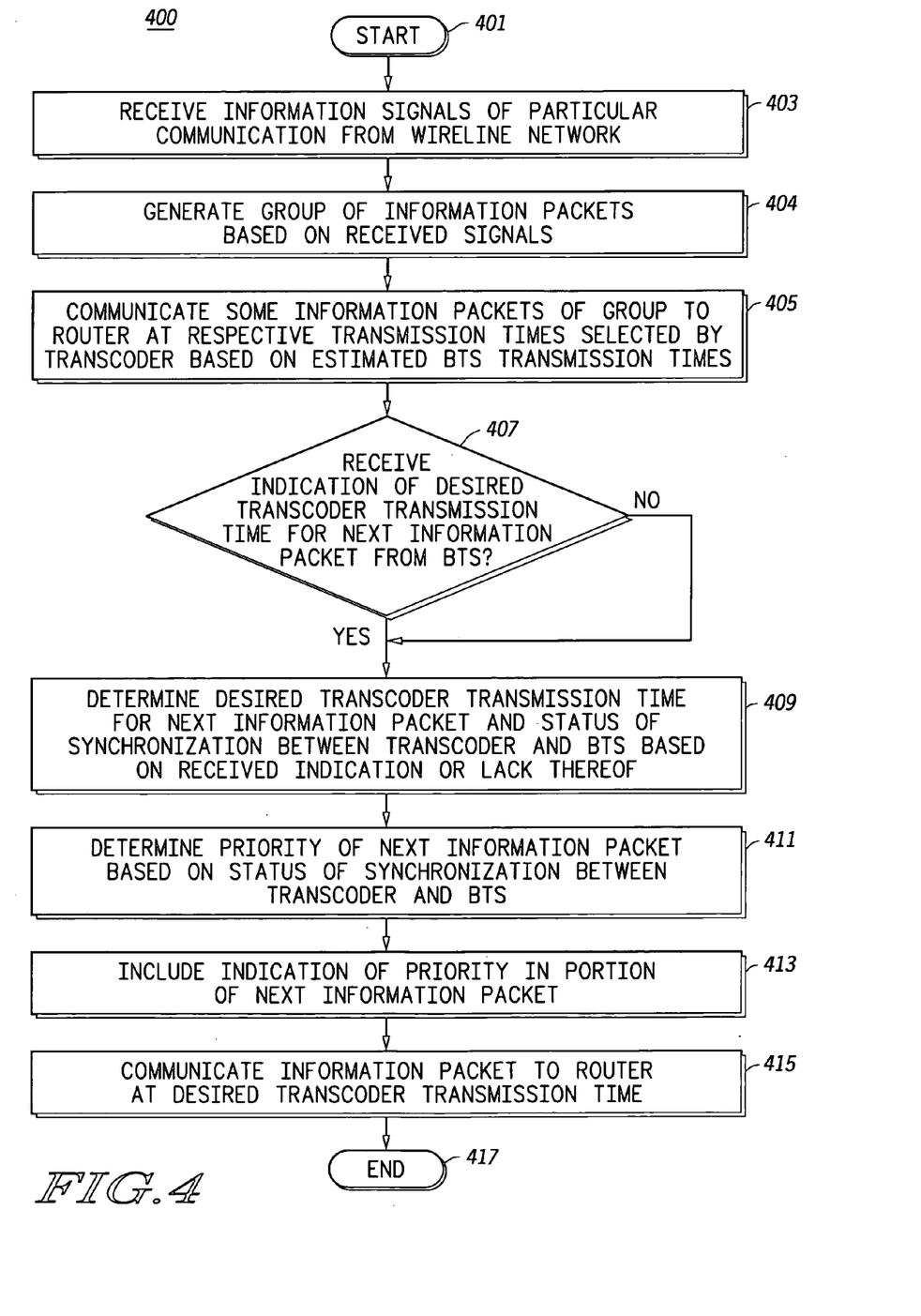
FIG. 4 illustrates a logic flow diagram of steps executed by a transcoder to assist in improving perceived signal quality of information transmitted by a base transceiver site in accordance with a preferred embodiment of the present invention.

FIG. 4 illustrates a logic flow diagram 400 of steps executed by a transcoder to assist in improving perceived signal quality of information transmitted by a base transceiver site in accordance with a preferred embodiment of the present invention. The logic flow begins (401) when the transcoder receives (403) information signals, such as PCM signals, of a particular communication from the wireline network. The transcoder then generates (404) a group of information packets based on the received signals. To generate the information packets, the transcoder encodes the information signals, preferably using VSELP encoding techniques, to create encoded information packets for subsequent transmission to the base transceiver site.

After generating the group of information packets, the transcoder communicates (405) some of the information packets of the group to the router at respective transmission times selected by the transcoder based on estimated base transceiver site transmission times. That is, as described above, the transcoder uses previously received transcoder transmission time indications to determine the appropriate transmission times for the information packets. After transmitting the packets, the transcoder determines (407) whether it has received an indication of a desired transcoder transmission time for the next information packet from the base transceiver site prior to the transcoder's own estimated transmission time for the next packet.

If the transcoder has not received such a transmission time indication, the transcoder assumes that the transcoder and the base transceiver site are in synchronization and the logic flow continues at block 409 where the transcoder determines (409) the desired transcoder transmission time for the next information packet and the status of synchronization between the transcoder and the base transmission site. As noted above, when no desired transmission time indication has been received from the base transceiver site prior to the transcoder's own estimated transmission time for the next packet, the transcoder presumes that the transcoder and the base transmission site are in synchronization and that no adjustment to the transcoder transmission time relative to the base transceiver site transmission time is necessary. On the other hand, if the transcoder has received an indication of a desired transcoder transmission time from the base transceiver site, the transcoder determines (409) the desired transmission time for the next information packet and the status of transcoder and base transceiver site synchronization based on the received transmission time indication. For example, when the indication indicates that an adjustment to the transcoder transmission time is necessary, the transcoder determines that the transcoder and the base transceiver site are presently in the process of synchronizing with respect to the information packets in the particular communication, and stores and/or processes the indication for future use in transmitting one or more subsequent packets of the communication. Alternatively, the indication may merely indicate that no adjustment need be made to the transcoder transmission time for the next information packet. In such an alternative case, the transcoder determines that the base transceiver site and the transcoder are in synchronization with respect to the information packets of the particular communication.

As discussed above, the indication of the desired transcoder transmission time preferably comprises a timing offset relative to the transcoder transmission time(s) of one or more previous information packets of the communication. Alternatively, the indication of the desired transcoder transmission time might comprise the actual desired transcoder transmission time in the event that the base transceiver site is provided sufficient information (e.g., from the router) to determine the expected router storage time for the next information packet of the communication to be transmitted by the transcoder.

After determining the status of synchronization between the transcoder and the base transceiver site, the transcoder determines (411) the priority of the next information packet based on the status of synchronization. As discussed above, when the indication of the desired transcoder transmission time indicates no adjustment is necessary to the transcoder transmission time for the next information packet, the base transceiver site and the transcoder are considered to be synchronized and the next information packet is given the highest priority. Alternatively, in the event that the indication of the desired transcoder transmission time indicates an offset or adjustment to the transcoder transmission time is necessary for the next information packet, the transcoder and the base transceiver site are considered to be presently synchronizing, in which case the next information packet is considered to be of a lower priority than other information packets which indicate synchronization between the transcoder and the base transceiver site.

After determining the priority of the next information packet, the transcoder includes (413) an indication of the priority in a portion of the information packet. The indication preferably comprises a group of bits that identify the status of the packet as being in a communication that is synchronized between the transcoder and the base transceiver site, in a communication that is presently synchronizing between the transcoder and the base transceiver site, or in some lower priority communication (e.g., a communication comprising only control information). After appropriately constructing the information packet, the transcoder communicates (415) the information packet to the router at the desired transcoder transmission time and the logic flow ends (417).

Thus, as described above, the logic flow depicted in FIG. 4 provides a method in which the transcoder prioritizes information packets of communications based on the transmission time synchronization between the transcoder and the base transceiver site with respect to those communications and information packets to inform the router as to the preferred priority for communicating the packets from the router to the respective base transceiver sites. In addition, the transcoder determines, based on the indication of a desired transcoder transmission time received from the base transceiver site, the transmission time for an upcoming information packet in an attempt to deliver the packet to the base transceiver site during a desired window of time just prior to the packet's transmission by the base transceiver site.

Figure 5A:
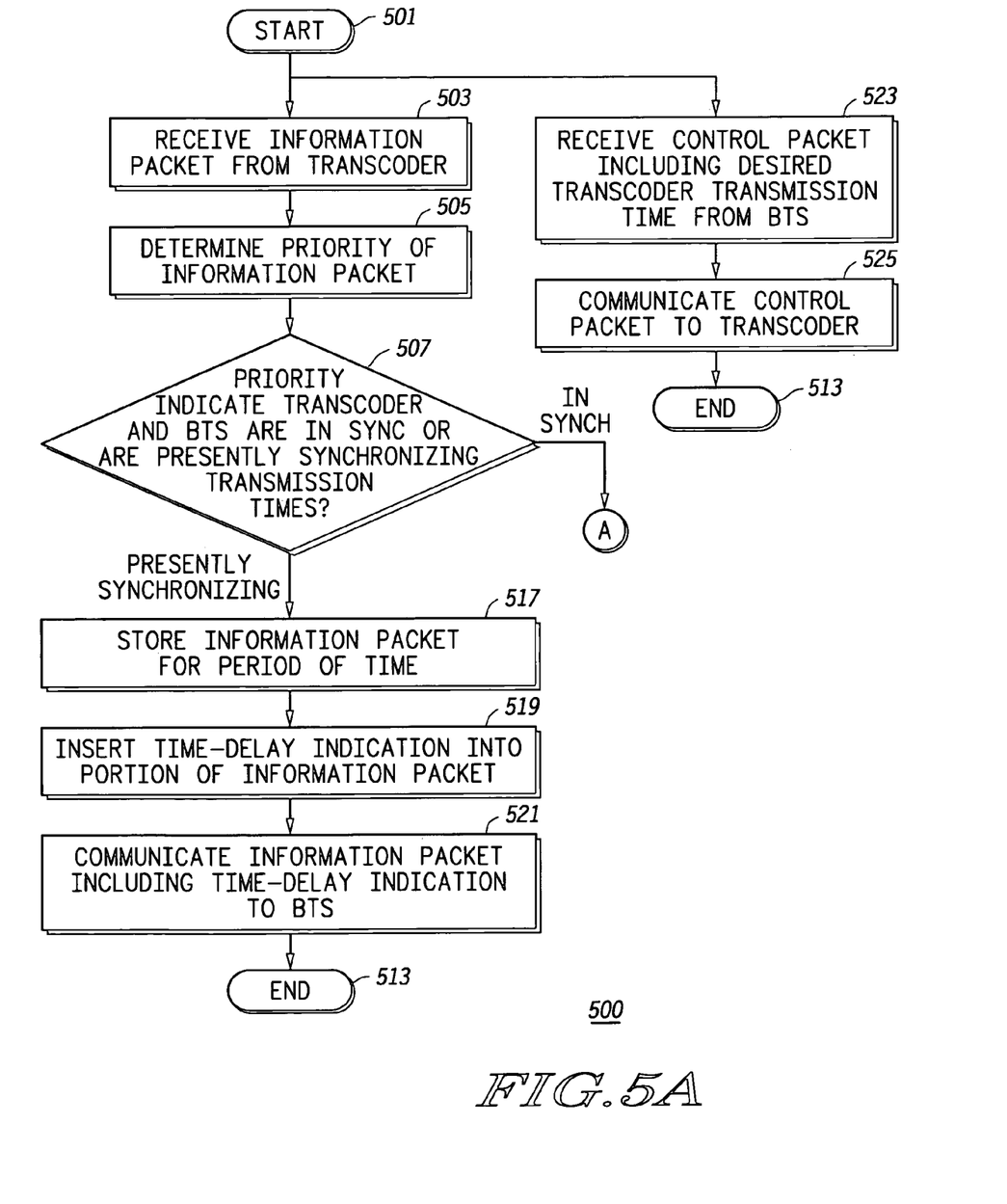
FIGS. 5A and 5B collectively illustrate a logic flow diagram of steps executed by a router to assist in improving perceived signal quality of information transmitted by a base transceiver site in accordance with a preferred embodiment of the present invention.
Figure 5B:
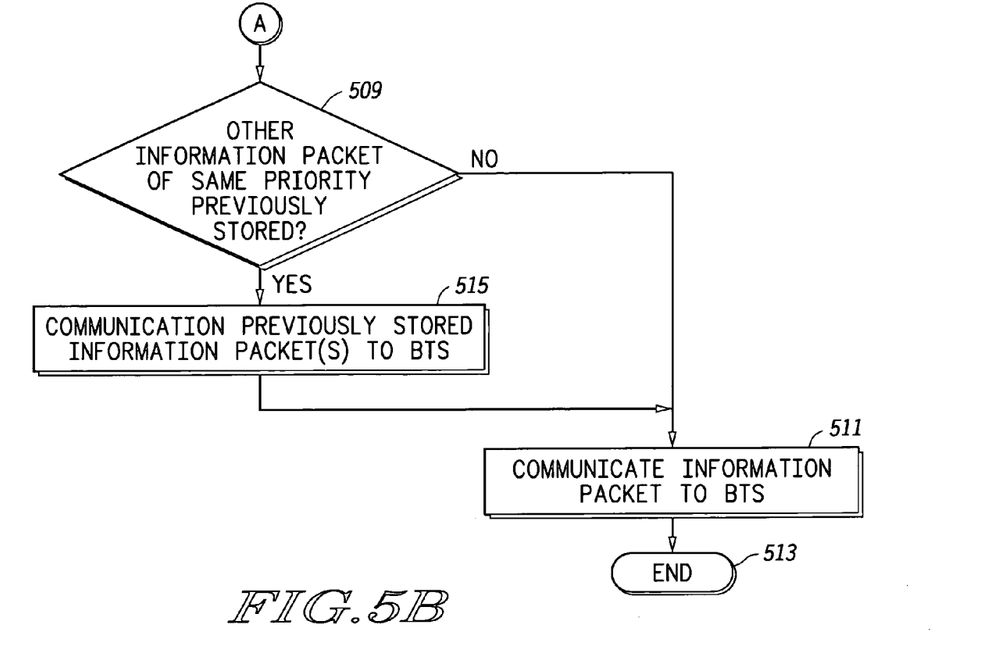

FIGS. 5A and 5B collectively illustrate a logic flow diagram 500 of steps executed by a router to assist in improving perceived signal quality of information transmitted by a base transceiver site in accordance with a preferred embodiment of the present invention. The logic flow begins (501) when the transcoder either receives (503) an information packet from the transcoder or receives (523) a control packet including a desired transcoder transmission time from the base transceiver site. As discussed above, the base transceiver site transmits indications of desired transcoder transmission times to the transcoder via the router in an attempt to synchronize the transcoder and the base transceiver site with respect to information packets in a particular communication, thereby reducing packet delays in the system and improving perceived quality of the communication. In the event that the router has received a control packet from the base transceiver site, the router communicates (525) the control packet to the transcoder and the logic flow ends (513).

On the other hand, in the event that the router has received (503) an information packet from the transcoder, the router determines (505) a priority of the information packet. To determine the priority of the packet, the router evaluates a portion of the packet (e.g., the header) that includes the priority indication. Based on the evaluation, the router determines (507) whether the priority indicates that the transcoder and the base transceiver site are in synchronization or are presently synchronizing their transmission times.

When the priority indicates that the transcoder and the base transceiver site are in synchronization, the router determines (509) whether other information packets of the same priority had been previously stored. If no prior equal priority packets are stored in the router, the router communicates (511) the recently received information packet to the base transceiver site and the logic flow ends (513). However, if at least one other information packet of the same priority is already stored in the router, the router preferably uses a FIFO algorithm. In accordance with the FIFO algorithm, the router first communicates (515) any previously stored information packets to their respective target base transceiver site(s) in the order in which they were received by the router, and then communicates (511) the most recently received information packet to its target base transceiver site, and the logic flow ends (513).

In the event that the priority indicates that the transcoder and the base transceiver site are presently synchronizing their transmission times, the router stores (517) the information packet in the router for an indeterminate period of time to enable higher priority packets of other communications, if any, to be communicated to their respective target base transceiver site(s). After the router storage period has expired, the router inserts (519) a time-delay indication into a portion (e.g., the header) of the information packet and communicates (521) the information packet including the time-delay indication to the base transceiver site, thereby ending (513) the logic flow. As discussed above, the time-delay indication preferably comprises the average period of time that the information packet and previous information packets of the particular communication were stored in the router. Alternatively, the time-delay indication may comprise a quantity of packets that were communicated by the router to the base transceiver site during the time period in which the subject information packet was stored in the router. Based on the quantity of packets, the base transceiver site may then calculate the packet storage period for a given packet or transmission frame size and an associated transmission speed of the communication link between the router and the base transceiver site.

Still further, the time-delay indication may comprise the period of time that the particular information packet itself is stored in the router. Alternatively, the time-delay indication may comprise an average quantity of packets that were communicated by the router to the base transceiver site or base transceiver sites during the time period in which the packet and any previous packets of the communication were stored in the router.

As discussed above and in additional detail below, the time-delay indication is used by the base transceiver site to synchronize the transcoder transmission time and the base transceiver site transmission time to reduce delays imposed by the system infrastructure on the information packets. Such reduction in infrastructure-imposed delays improves the quality of the communication containing the packets as perceived by a user of a wireless communication device that receives the communication from the base transceiver site.

Therefore, as described above with respect to FIG. 5, the router evaluates the priority of each information packet that it receives from the transcoder to determine the status of synchronization between the transcoder and the base transceiver site and, based on the priority, routes information packets to the base transceiver site(s) in such a manner as to reduce the delay imposed by the infrastructure on the packet, especially with respect to packets involved in synchronized communications, thereby improving the perceived quality of the communications containing such packets. In addition, the router indicates, in each packet that was stored in the router, the amount of time that the packet was so stored to enable the base transceiver site to instruct the transcoder as to how to adjust its transmission time to provide subsequent information packets to the base transceiver site within desired windows of time just prior to the base transceiver site's respective transmission times for the packets.

Figure 6:
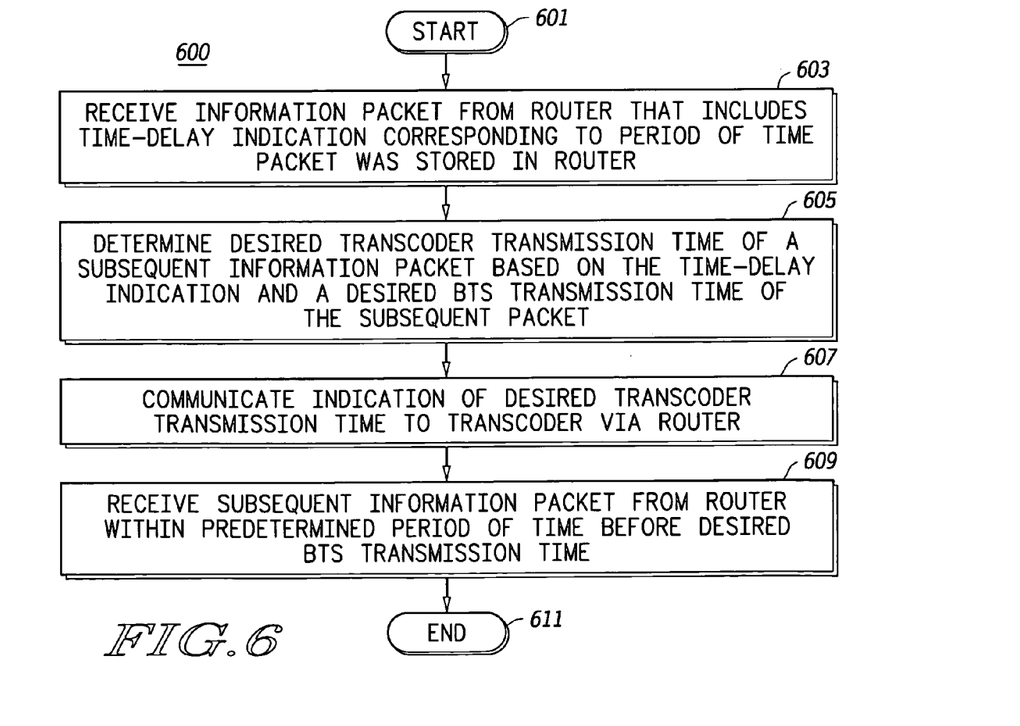
FIG. 6 illustrates a logic flow diagram of steps executed by a base transceiver site to assist in improving perceived signal quality of information transmitted by the base transceiver site in accordance with a preferred embodiment of the present invention.

FIG. 6 illustrates a logic flow diagram 600 of steps executed by a base transceiver site to assist in improving perceived signal quality of information transmitted by the base transceiver site in accordance with a preferred embodiment of the present invention. The logic flow begins (601) when the base transceiver site receives (603) an information packet from the router that includes a time-delay indication corresponding to the period of time that the packet was stored in the router. In the event that the packet was not stored in the router, the time-delay indication may be zero or may be excluded from the information packet all together. As discussed above, the time-delay indication preferably comprises the average period of time that the information packet and any previous information packets of the same communication were stored in the router.

After receiving the information packet, the base transceiver site determines (605) a desired transcoder transmission time of a subsequent information packet based on the time-delay indication, the present packet's arrival time at the base transceiver site, and a desired base transceiver site transmission time of the subsequent packet. Thus, the base transceiver site determines the adjustment, if any, that is necessary to the transcoder transmission time to enable the base transceiver site to receive the subsequent packet within a predetermined period of time before the base transceiver site's transmission time. The predetermined period of time preferably comprises the time span of a time slot immediately preceding the time slot in which the subsequent information packet is to be transmitted by the base transceiver site in accordance with the time-based wireless transmission protocol of the communication system.

To determine the desired transcoder transmission time in the preferred embodiment, the base transceiver site compares the arrival time of the packet at the base transceiver site to the base transceiver site's transmission time. Based on the comparison, the base transceiver site calculates a timing offset to be added to or subtracted from the transcoder's respective transmission times for subsequent packets. For example, if the transcoder transmitted its packet at time $t_1$ and the packet arrived at the base transceiver site too early by an amount of time $d_1$ the desired transcoder transmission time is $t_1$ plus an offset (e.g., $d_1$) computed to have subsequent packets arrive at the base transceiver site within a desired window of time prior to the respective base transceiver site transmission times of the subsequent packets. Similarly, if the transcoder transmitted its packet at time $t_2$ and the packet arrived at the base transceiver site too late by an amount of time $d_2$, the desired transcoder transmission time is $t_2$ minus an offset (e.g., $d_2$) computed to have subsequent packets arrive at the base transceiver site within a desired window of time prior to the respective base transceiver site transmission times of the packets.

Alternatively, in the event that the time-delay indication comprises an actual or average quantity of packets transmitted by the router while the packet was stored in the router as opposed to a storage time of the packet in the router, the base transceiver site computes the desired transcoder transmission time by preferably determining a frame size of the non-deterministic packetized transport and an associated transmission speed of the link between the router and the base transceiver site, and then determining the desired transcoder transmission time based on the frame size, the link transmission speed, and the quantity of packets that were conveyed by the router to the base transceiver site during the period of time that the information packet was stored in the router. For example, the frame size for the transport between the router and the base transceiver site is approximately 424 bits in the "MOTOROLA" "iDEN" system. The transmission speed of the link between the transcoder and the base transceiver site is approximately 16 kilobits per second (kbps) in the "MOTOROLA" "iDEN" system. Accordingly, the desired transcoder transmission time for a packet in the "iDEN" system might be given by the following equation:

$$T_s = 0.0265 \times N,$$

where $T_s$ is the storage period in seconds and N is the number of packets communicated while the packet-at-issue was stored in the router (assuming the N previously communicated packets were all the same length in bits). The frame size and transmission speed of the link or packetized transport are preferably stored in the router at the time of installation of the router or at some later time, such as through the use of remote programming.

After the base transceiver site determines the desired transcoder transmission time or an offset to apply to the present transcoder transmission time, the base transceiver site communicates (607) an indication of the desired transcoder transmission time to the transcoder via the router. The indication preferably comprises a group of bits that indicate the offset the transcoder is to apply to the transcoder transmission time(s) of one or more upcoming packet transmissions relative to associated base transceiver site transmission time(s). For example, if the transcoder transmitted the prior information packet at time $t_1$ and the base transceiver site determined that that packet arrived too early, the indication preferably comprises an offset to instruct the transcoder to transmit the next packet at a relative time $t_1$ plus the offset in an attempt to have the packet arrive at the base transceiver site within a desired window of time prior to transmission of the packet by the base transceiver site.

Some time after communicating the indication of the desired transcoder transmission time to the transcoder, the base transceiver site receives (609) a subsequent information packet from the router within the predetermined period of time before the desired base transceiver site transmission time. The base transceiver site then transmits the subsequent packet to a wireless communication device in accordance with the time-based wireless transmission protocol of the system, and the logic flow ends (611).

Therefore, as discussed above with respect to FIG. 6, the base transceiver site evaluates each received information packet to determine how long it was stored in the router and then uses the storage time-delay indication, the arrival time of packet at the base transceiver site and the base transceiver site's next transmission time to instruct the transcoder when to transmit a particular communication's next information packet or group of information packets (e.g., when router storage time evaluation and transcoder transmission time instruction are based on averages), such that the packet or packets will arrive within respective desired windows of time prior to the corresponding base transceiver site's transmission times for the packets, thereby reducing the effective delays of the packets in the infrastructure. The reduction of delays in this manner improves the perceived quality of the communication from the perspective of the user of a wireless communication device receiving the communication from the base transceiver site.

Although described above primarily with respect to its application to audio information, the present invention is equally applicable to video communications or communication of any other information in real-time. For example, the present invention may be used to improve transmission of video (and audio when both audio and video information are included in any particular transmission frame) from an Internet server to a laptop computer that includes a PCMCIA card to facilitate the transmission and reception of radio signals.

The present invention encompasses a full duplex wireless communication system and method for improving perceived signal quality of transmitted information within the system. With this invention, delay of audio packets is reduced within the system through the use of a synchronization-based priority scheme. The router communicates packets to the base transceiver site based on their respective priority. However, in contrast to typical priority schemes in which information is conveyed based on its content or on the identity of the source of the information, the priority scheme of the present invention is based on the status of synchronization of transmission times between the transcoder and the base transceiver site. The closer such status is to synchronization, the higher the priority assigned to the packet and the faster the packet is routed by the router. The use of such a priority scheme by the transcoder and the router enables packets in synchronized communications to be delivered to the base transceiver site more quickly, thereby reducing potential packet delay and improving the perceived quality of the communication containing the packets.

Delay is also reduced in accordance with the present invention through the use of time-delay indications inserted into the packets by the router to indicate the amount of time that each packet was stored in the router. The use of such indications enables the base transceiver site to more accurately instruct the transcoder as to whether any adjustment is necessary with respect to the transcoder's transmission time to insure that each packet is received at the base transceiver site prior to the base transceiver site's transmission time, thereby decreasing the likelihood of dropped packets, and preferably within a desired window of time just prior to the base transceiver site's transmission time to minimize the delay incurred by the packet. Both the reduction in the likelihood of dropped packets and the reduction of incurred delay serve to improve the quality of the communication as perceived by a user of a wireless communication device receiving the packets. The above benefits of the present invention are in sharp contrast to prior art systems that utilize a non-deterministic packetized transport between the base site controller and the base transceiver site, but do not accurately account for the variable delays introduced by storage of the packets in the router or by the equal weight given each packet by the router.

While the foregoing constitute certain preferred and alternative embodiments of the present invention, it is to be understood that the invention is not limited thereto and that in light of the present disclosure, various other embodiments will be apparent to persons skilled in the art. For example, although the router 203 is depicted in FIG. 2 as being located in the BSC 107, the router 203 may be alternatively located in the ACG 105 or distributed between the BSC 107 and the ACG 105. Accordingly, it is to be recognized that changes can be made without departing from the scope of the invention as particularly pointed out and distinctly claimed in the appended claims which shall be construed to encompass all legal equivalents thereof.

What is claimed is:

1. In a time division multiple access wireless communication system that facilitates full duplex transmission of information, the wireless communication system including at least a transcoder, a base transceiver site and a router, the router being operably coupled between the transcoder and the base transceiver site and supporting a non-deterministic packetized transport for communicating information between the transcoder and the base transceiver site as a plurality of information packets, a method for the router to assist in improving signal quality of information transmitted by the base transceiver as perceived by a user of a wireless communication device, the method comprising the steps of:

receiving at least one information packet from the transcoder;

communicating the at least one information packet to the base transceiver site in accordance with a priority scheme, wherein the at least one information packet forms part of a first communication and wherein the step of communicating comprises determining a priority of a first information packet of the at least one information packet and when the priority indicates that the transcoder and the base transceiver site are presently synchronizing the transcoder transmission time and the base transceiver site transmission time, storing the first information packet for a period of time to enable at least one higher priority information packet of a second communication to be communicated from the transcoder to the base transceiver site;

when the priority indicates that the transcoder and the base transceiver site are presently synchronizing the transcoder transmission time and the base transceiver site transmission time, the method further comprising the steps of:

inserting a time-delay indication into a portion of the first information packet, the time-delay indication corresponding to the period of time that the first information packet was stored in the router; and communicating the first information packet including the time-delay indication to the base transceiver site, wherein the time-delay indication is used by the base transceiver site to synchronize transcoder transmission time to base transceiver site transmission time.

2. The method of claim 1, wherein the priority scheme is based on a status of synchronization of transcoder transmission time and base transceiver site transmission time with respect to the at least one information packet and wherein the step of communicating further comprises:

when the priority indicates that the transcoder transmission time is substantially in synchronization with the base transceiver site transmission time, communicating the first information packet to the base transceiver site.

3. The method of claim 1, wherein the time-delay indication comprises the period of time that the first information packet was stored in the router.

4. The method of claim 1, wherein the time-delay indication comprises a quantity of packets that were communicated by the router to the base transceiver site during the period of time that the first information packet was stored in the router.

5. The method of claim 1, wherein the time-delay indication comprises an average period of time that the first information packet and previous information packets of the first communication were stored in the router.

6. The method of claim 1, wherein the time-delay indication comprises an average quantity of packets that were communicated by the router to the base transceiver site during the period of time that the first information packet and previous information packets of the first communication were stored in the router.

7. The method of claim 1, wherein the step of determining a priority of the first information packet comprises the step of evaluating a portion of the first information packet that includes an indication of the priority.

8. The method of claim 1, wherein the at least one information packet includes a first information packet that forms part of a first communication and a second information packet that forms part of a second communication and wherein the step of communicating comprises the steps of:

determining a priority and a time of arrival of the fist information packet;

determining a priority and a time of arrival of the second information packet;

when both the priority of the first information packet and the priority of the second information packet respectively indicate that transcoder transmission time is substantially in synchronization with base transceiver site transmission time, communicating the first information packet to the base transceiver site when the time of arrival of the first information packet precedes the time of arrival of the second information packet; and communicating the second information packet to the base transceiver site when the time of arrival of the second information packet precedes the time of arrival of the first information packet.

9. The method of claim 1, wherein the information packet comprises at least one of an audio information packet and a video information packet.

10. In a time division multiple access wireless communication system that facilitates fill duplex transmission of information, the wireless communication system including at least a transcoder, a base transceiver site and a router, the router being operably coupled between the transcoder and the base transceiver site and supporting a non-deterministic packetized transport for communicating information between the transcoder and the base transceiver site as a plurality of information packets, a method for the transcoder to assist in improving signal quality of information transmitted by the base transceiver site as perceived by a user of a wireless communication device, the method comprising the steps of:

determining a priority of an information packet;

including an indication of the priority in a portion of the information packet; and communicating the information packet to the router, whereby the indication of priority is used by the router to prioritize communication of information packets to the base transceiver site, wherein the information packet forms part of a first communication and wherein the method further comprises the steps of:

prior to the step of determining a priority;

receiving an indication of a desired transcoder transmission time for the information packet, the indication of the desired transcoder transmission time being based on a period of time that at least one prior information packet of the first communication was stored in the router; and determining the desired transcoder transmission time of the information packet based on the indication of the desired transcoder transmission time;

and wherein the step of communicating comprises the step of communicating the information packet to the router at the desired transcoder transmission time.

11. The method of claim 10, wherein determining the priority of the information packet comprises determining the priority of the information packet based on a status of synchronization of transcoder transmission time and base transceiver site transmission time with respect to the information packet.

12. The method of claim 11, further comprising the step of:

prior to the step of determining a priority:

determining the status of synchronization of transcoder transmission time and base transceiver site transmission time with respect to the information packet based on the indication of the desired transcoder transmission time.

13. The method of claim 11, wherein the information packet comprises an audio packet and wherein the step of communicating the information packet to the router at the desired transcoder transmission time results in reduced audio delay of the information packet.

14. The method of claim 11, wherein the step of receiving an indication comprises the step of receiving an indication of a desired transcoder transmission time for the information packet, the indication of the desired transcoder transmission time being based on an average period of time that a plurality of prior information packets of the first communication were stored in the router.

15. The method of claim 11, wherein the indication of the desired transcoder transmission time comprises a timing offset from a transcoder transmission time of a prior information packet of the at least one prior information packet of the first communication.

16. The method of claim 15, wherein the step of determining a priority of an information packet comprises the steps of:

when the timing offset is equal to zero, determining that the transcoder transmission time is synchronized with the base transceiver site transmission time;

when the timing offset is not equal to zero, determining that the transcoder and the base transceiver site are presently synchronizing the transcoder transmission time and the base transceiver site transmission time; and determining the priority of the information packet as being higher when the transcoder transmission time is synchronized with the base transceiver site transmission time than when the transcoder and the base transceiver site are presently synchronizing.

17. The method of claim 10, wherein the information packet forms part of a first communication and wherein the step of determining a priority of an information packet comprises the steps of:

determining whether an indication of a desired transcoder transmission time had been received within a predetermined period of time after conveyance of a prior information packet of the first communication; and when the indication of the desired transcoder transmission time had not been received within the predetermined period of time, determining that the information packet is of highest priority.

18. In a time division multiple access wireless communication system that facilitates full duplex transmission of information, the wireless communication system including at least a transcoder, a base transceiver site and a router, the router being operably coupled between the transcoder and the base transceiver site and supporting a non-deterministic packetized transport for communicating information between the transcoder and the base transceiver site as a plurality of information packets, a method for the base transceiver site to assist in improving signal quality of transmitted information as perceived by a user of a wireless communication device, the method comprising the steps of:

receiving an information packet from the router, the information packet including a time-delay indication, and the time-delay indication corresponding to a period of times that the information packet was stored in the router;

determining a desired transcoder transmission time of a subsequent information packet based at least on the time-delay indication and a desired base transceiver site transmission time; and communicating an indication of the desired transcoder transmission time to the transcoder.

19. The method of claim 18, further comprising the step of receiving the subsequent information packet within a predetermined time period before the desired base transceiver sire transmission time.

20. The method of claim 19, wherein the desired base transceiver site transmission time comprises commencement of a first time slot and wherein the predetermined period of time comprises a time span of a second time slot immediately preceding the first time slot.

21. The method of claim 18, wherein the time-delay indication comprises the period of time that the information packet was stored in the router.

22. The method of claim 18, wherein the time-delay indication comprises a quantity of packets that were communicated by the router to the base transceiver site during the period of time that the information packet was stored in the router.

23. The method of claim 22, wherein the step of determining a desired transcoder transmission time comprises the steps of:
- determining a frame size and an associated transmission speed of the non-deterministic packetized transport between the router and the base transceiver site; and
- determining the desired transcoder transmission time based at least on the frame size of the non-deterministic packetized transport, the associated transmission speed of the non-deterministic packetized transport, and the quantity of packets that were communicated by the router to the base transceiver site during the period of time that the information packet was stored in the router.

24. In a time division multiple access wireless communication system that facilitates full duplex transmission of information, the wireless communication system including at least a transcoder, a base transceiver site and a router, the router being operably coupled between the transcoder and the base transceiver site and supporting a non-deterministic packetized transport for communicating information between the transcoder and the base transceiver site as a plurality of information packets, a method for the router to assist in improving signal quality of information transmitted by the base transceiver site as perceived by a user of a wireless communication device, the method comprising the steps of:
- receiving an information packet from the transcoder;
- storing the information packet for a period of time;
- inserting a time-delay indication into a portion of the information packet, the time-delay indication corresponding to the period of time that the information packet was stored in the router; and
- communicating the information packet including the time-delay indication to the base transceiver site, wherein the time-delay indication is used by the base transceiver site to synchronize transcoder transmission time to base transceiver site transmission time.

25. The method of claim 24, further comprising the steps of:
- receiving an indication of a desired transcoder transmission time from the base transceiver site, the indication of the desired transcoder transmission time being based at least partly on a time-delay indication of at least one prior information packet; and
- communicating the indication of the desired transcoder transmission time to the transcoder.

26. The method of claim 24, wherein the time-delay indication comprises the period of time that the information packet was stored in the router.

27. The method of claim 24, wherein the time-delay indication comprises a quantity of packets that were communicated by the router to the base transceiver site during the period of time that the information packet was stored in the router.

28. In a time division multiple access wireless communication system that facilitates full duplex transmission of information, the wireless communication system including at least a transcoder, a base transceiver site and a router, the router being operably coupled between the transcoder and the base transceiver site and supporting a non-deterministic packetized transport for communicating information between the transcoder and the base transceiver site as a plurality of information packets, a method for the transcoder to assist in improving signal quality of information transmitted by the base transceiver site as perceived by a user of a wireless communication device, the method comprising the steps of:
- communicating a first group of information packets to the router, the first group of information packets forming part of a first communication;
- prior to communicating an additional information packet of the first communication to the router, receiving an indication of a desired transcoder transmission time for the additional information packer, the indication being based on a period of time that the at least one information packet of the first group of information packets was stored in the router;
- determining the desired transcoder transmission time of the additional information packet based on the indication of the desired transcoder transmission time; and
- communicating the additional information packet to the router at the desired transcoder transmission time.

29. The method of claim 28, wherein the indication of the desired transcoder transmission time comprises a timing offset from a transcoder transmission time of an information packet of the first group of information packets.

30. The method of claim 28, wherein the indication is based on an average period of time that information packets of the first group of information packets were stored in the router.

31. The method of claim 30, wherein each information packet of the first group of information packets is communicated to the router at a respective transcoder transmission time, wherein each respective transcoder transmission time of an information packet in the first group of information packets corresponds to a respective timing offset from at least one preceding transcoder transmission time, and wherein the indication of the desired transcoder transmission time comprises a timing offset from an information packet in the first group of information packets that is computed by averaging the respective timing offsets applied to the information packets in the first group of information packets.

* * * * *